United States Patent
Crowley et al.

(10) Patent No.: US 10,970,233 B2
(45) Date of Patent: Apr. 6, 2021

(54) DETERMINING MULTIPLE VIRTUAL HOST PORTS ON A SAME PHYSICAL HOST PORT

(71) Applicant: EMC IP Holding Company LLC, Hopkinton, MA (US)

(72) Inventors: Owen Crowley, Carrigaline (IE); Erik P. Smith, Douglas, MA (US); Scott Rowlands, Marietta, GA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/176,428

(22) Filed: Oct. 31, 2018

(65) Prior Publication Data
US 2020/0133895 A1    Apr. 30, 2020

(51) Int. Cl.
*G06F 13/16* (2006.01)
*G06F 9/455* (2018.01)

(52) U.S. Cl.
CPC ...... *G06F 13/1605* (2013.01); *G06F 9/45558* (2013.01); *G06F 2009/45579* (2013.01); *G06F 2009/45583* (2013.01); *G06F 2213/0008* (2013.01)

(58) Field of Classification Search
CPC ............. G06F 3/00; G06F 13/24; G06F 9/455
See application file for complete search history.

(56) References Cited

U.S. PATENT DOCUMENTS

| | | | |
|---|---|---|---|
| 6,445,682 B1 * | 9/2002 | Weitz ................. | H04L 12/2856 370/257 |
| 6,593,878 B2 * | 7/2003 | Fall .................... | G01S 19/35 342/357.4 |
| 7,307,998 B1 * | 12/2007 | Wang ................... | H04L 49/90 370/412 |
| 2003/0177290 A1 * | 9/2003 | Ayukawa ............... | H04L 45/245 710/10 |
| 2008/0228972 A1 * | 9/2008 | Pickett ................ | H04L 12/43 710/105 |
| 2012/0084071 A1 * | 4/2012 | Cyr .................... | G06F 11/0712 703/25 |
| 2013/0212345 A1 * | 8/2013 | Nakajima .............. | G06F 3/0605 711/161 |

OTHER PUBLICATIONS

U.S. Appl. No. 16/176,752, filed Oct. 31, 2018, Smith, et al.
U.S. Appl. No. 16/177,548, filed Nov. 1, 2018, Copley, et al.

* cited by examiner

*Primary Examiner* — Getente A Yimer
(74) *Attorney, Agent, or Firm* — Muirhead and Saturnelli, LLC

(57) ABSTRACT

Multiple virtual host ports corresponding to a same physical host port may be determined by or on behalf of a storage system, for example, in response to logging the one or more virtual host ports into the storage system. For one or more virtual host ports, it may be determined whether the virtual host port is connected to a same fabric port as another virtual host port, where a fabric port is a port of a fabric configured to connect to a virtual host port. If two virtual host ports are determined to be connected to a same fabric port, it may be concluded that the two virtual host ports correspond to (e.g., share) a same physical host port. One or more actions may be taken on a storage network based at least in part on a determination that two virtual host ports are sharing a same physical host port.

17 Claims, 14 Drawing Sheets

| Storage Device | Host Port | Storage System Port | Other Info |
|---|---|---|---|
| Dev0 | WWN12 | WWN45 | |
| Dev1 | WWN9 | WWN117 | |
| ... | | | |
| Devn | WWN77 | WWN6 | |

FIG. 8

| Initiator Port | Target Port | Other Info |
|---|---|---|
| WWW1 | WWW3 | |
| WWW7 | WWW8 | |
| ... | | |
| WWW9 | WWW2 | |

FIG. 9

DETERMINING MULTIPLE VIRTUAL HOST PORTS ON A SAME PHYSICAL HOST PORT

BACKGROUND

Technical Field

This application generally relates to data storage and, in particular, satisfying performance objectives for applications utilizing data storage resources.

Description of Related Art

Data storage systems may include resources used by one or more host systems (i.e., "hosts"). Data storage systems and host systems may be interconnected by one or more communication connections such as in a network. These resources may include, for example, data storage devices such as those included in the data storage systems manufactured by EMC Corporation of Hopkinton Mass. ("Dell EMC"). These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform I/O operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

One or more hosts and one or more storage system may be part of a storage network, for example, a storage area network (SAN), that also includes one or more switches. A switch may include a plurality or ports configured to be connected (e.g., by a cable) to ports of a host system. These switch ports may be referred to herein as switch host ports (SHPs) or fabric ports. A switch also may include one or more ports configured to be connected (e.g., by a cable) to ports on a storage system (e.g., on a front-end of a storage system as part of a host adapter), which may be referred to herein as switch storage ports or SSPs. The one or more switches may be organized into one or more logical switching entities referred to herein as switch fabric (i.e., "fabric"). A fabric is a logical entity that includes one or more SHPs and one or more SSPs as its members, for which I/O communications associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name.

A host system may host applications that utilize storage devices of the storage system. For a given application, to perform I/O operations utilizing a storage device of the storage system, one or more components of each of: a host; a switch; and a storage system may be used; i.e., communications for performing I/O operations may be transmitted through these one or more components. The one or more combinations of components of the host, switch and storage system over which I/O operations between an application and storage device can be communicated may be considered an I/O path between the application and the storage device. These I/O paths define a connectivity of the storage network.

SUMMARY OF THE INVENTION

A method may be performed, including determining a plurality of virtual host ports connected to a storage system, determining that at least two of the plurality of virtual host ports are connected to a same fabric port of a switch, and determining that the at least two virtual host ports correspond to a same physical host port based at least in part on the at least two virtual host ports being connected to the same fabric port of the switch. The method may include determining whether there is a single point of failure between a storage device of the storage system and an application layer of a host system based at least in part on the at least two ports corresponding to a same physical host port. The method may include determining that a workload corresponds to a first of the at least two ports based at least in part on the at least two virtual host ports corresponding to a same physical host port. The method may include determining that a port on the storage system is not at fault for one or more communication failures between the storage system port and the at least two virtual host ports based at least in part on the at least two ports corresponding to a same physical host port. The method may include, prior to determining that at least two of the plurality of virtual host ports are connected to a same fabric port of a switch, determining that the at least two ports are of a same host system. Determining that at least two of the plurality of virtual host ports are connected to a same fabric port of a switch may include the storage system issuing a query to the switch, the query including an identifier of at least one of the at least two virtual host ports, and the switch sending to the storage system a response to the query, the response including an identifier of the fabric port. The query may be a GFPN_ID query in accordance with a Fibre Channel protocol.

In some embodiments, a computer network is provided including a storage system and at least one host system having a plurality of instances of applications executing thereon. The system may include one or more processors; and a memory including code stored thereon that, when executed, performs the above-described method.

In some embodiments, one or more computer-readable media, for example, non-transitory computer-readable media, are provided for a system including a storage system and at least one host system having a plurality of instances of applications executing thereon. The computer-readable media has software stored thereon including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

DETAILED DESCRIPTION OF EMBODIMENTS

Figure 1:
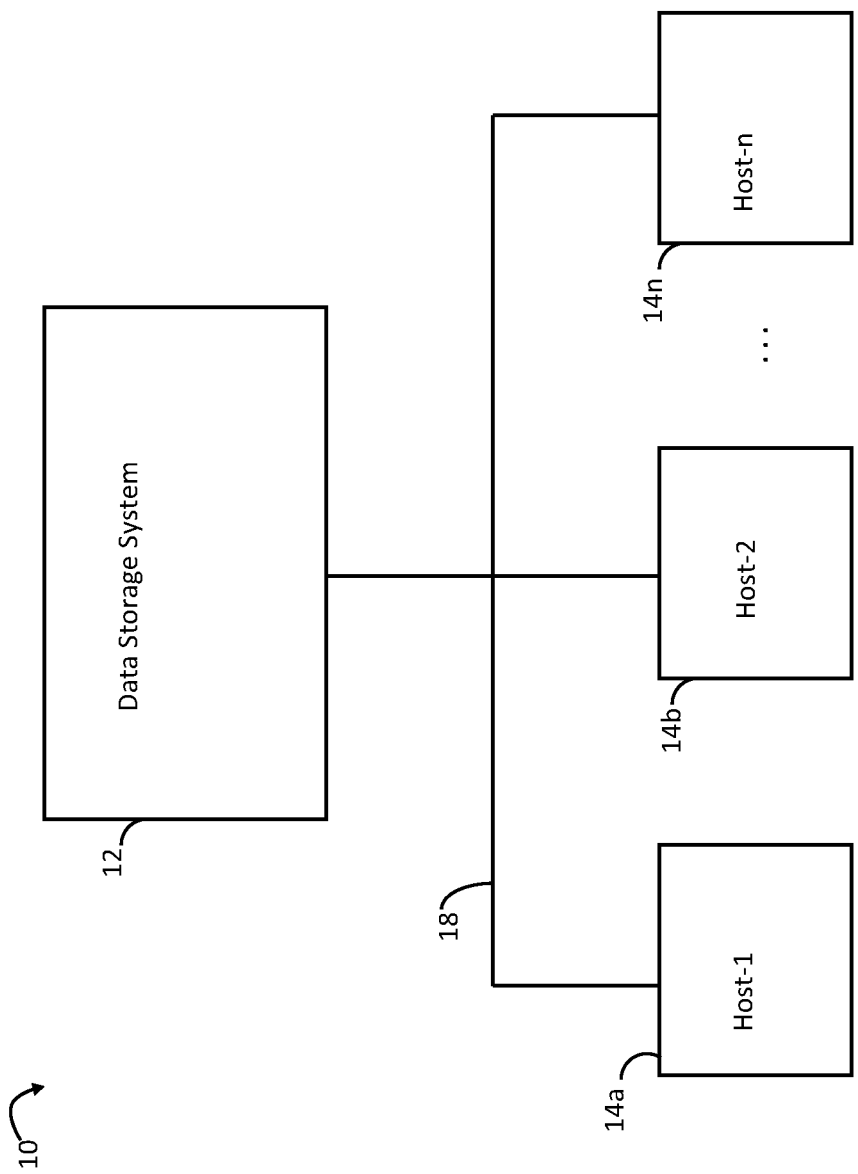
FIG. 1 is a block diagram illustrating an example of a system according to embodiments of the invention.

Some technologies allow multiple virtual host ports to exist for a single physical host port. For example, in accordance with Fibre Channel (FC) technology, N Port ID Virtualization (NPIV) allows multiple Virtual_N ports to share a single physical host port, in which case each virtual port may have its own unique port ID (e.g., a unique Word Wide Names (WWNs)), even though both different port IDs correspond to a same physical port. Thus, multiple virtual host ports having different port IDs (e.g., per NPIV) may share a single physical host port. These virtual host ports are sometimes used to associate different virtual host ports with different host-related entities such as, for example, different virtual servers or applications running on a host.

A storage system may not be aware that two port IDs correspond to a same physical host port, but rather consider and treat the two port IDs as identifying two separate physical host ports. This misconception can lead to the inability of the storage system to identify a single point of failure (SPoF) between storage devices and applications or to properly assess the workload of a physical host port, and can also lead to the false conclusion that a port on a storage system is not operating properly; i.e., based on the mistaken belief that multiple different physical ports are experiencing connectivity loss or other connectivity issues with the storage system port when in fact it is only one such physical port.

Thus, it would be desirable to be able to determine when multiple virtual hosts correspond to a same physical host; i.e., when multiple host port IDs correspond to a same physical host port.

Described herein are a system and techniques, which may be employed by or on behalf of a storage system, for determining whether multiple virtual ports correspond to a same physical port; i.e., by determining whether multiple host port IDs correspond to a same physical host port, for example, in response to logging the one or more virtual host ports into the storage system. For one or more virtual host ports, it may be determined whether the virtual host port is connected to a same fabric port as another virtual host port, where a fabric port is a port of a fabric configured to be physically connected to a physical host port, which may mean it is logically connected to multiple virtual host ports. A fabric port also may be referred to herein as an SHP. If two virtual host ports are determined to be logically connected to a same fabric port, it may be concluded that the two virtual host ports correspond to (e.g., share) a same physical host port. In some embodiments, the storage system may know the host ID (e.g., name) of the host of the virtual host port, in which case only information pertaining to the other virtual host ports of the identified host may be analyzed to determine if any other port is connected to the same fabric port, which may save time and system resources.

In some embodiments, determining whether at least two of the plurality of virtual host ports are connected to a same fabric port of a switch (or conversely determining whether at least two of the plurality of virtual host ports connected to different fabric ports of a switch) includes the storage system issuing one or more queries to the switch, each of the one or more queries including an identifier of at least one of the at least two virtual host ports, and the switch sending to the storage system a response to each query, the response including an identifier of the fabric port for each specified port identifier. In embodiments of the invention using FC technology, the query may be a GFPN_ID query.

One or more actions may be taken on a storage network based at least in part on a determination that two virtual host ports are sharing a same physical host port. For example, it may be determined whether there is an SPoF between a storage device of the storage system and an application layer of a host system based at least in part on the at least two ports corresponding to a same physical host. In some embodiments, it may be determined that a workload corresponds to a first virtual host port based at least in part on a determination that the first virtual host port shares a physical host port with a second virtual host port, and this determination may be used to assess and potentially adjust workload on the physical host port.

In some embodiments, it may be determined that a port on the storage system is not at fault for one or more communication failures between the storage system port and the at least two virtual host ports based at least in part on at least two virtual ports corresponding to a same physical host port, as described in more detail elsewhere herein.

Illustrative embodiments of the invention will now be described in more detail in relation to the figures.

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2B:
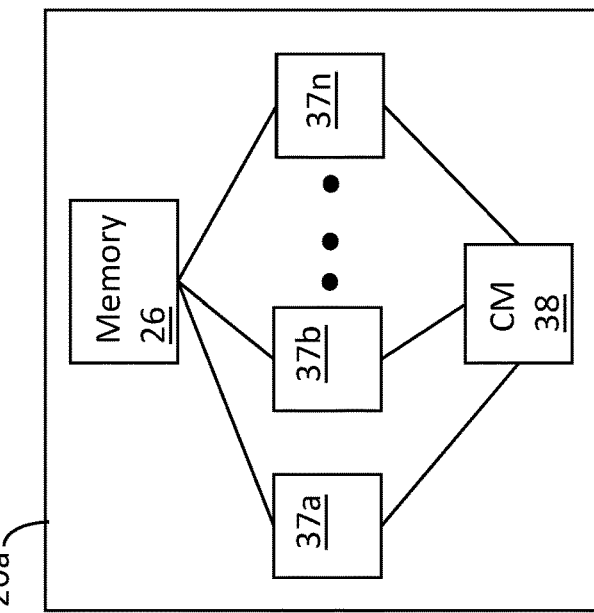
FIG. 2B is a block diagram illustrating an example of logical internal communications between directors and memory of the data storage system of FIG. 2A according to embodiments of the invention.
Figure 2A:
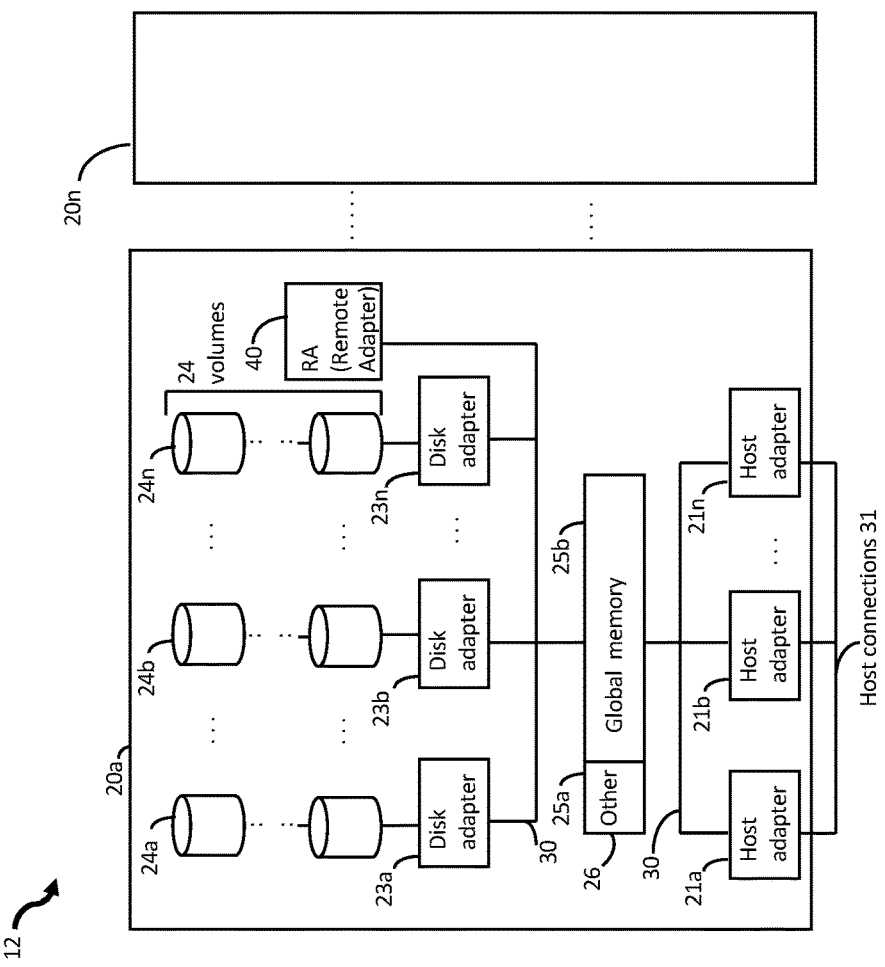
FIG. 2A is a block diagram illustrating an example of a data storage system according to embodiments of the invention.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of physical data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting physical storage devices may be any suitable physical storage device such as a rotating disk drive, flash-based storage, and the like. The particular data storage system as described in this embodiment, or a particular physical storage device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host. The unqualified term "storage device" as used herein means a logical device or physical storage device.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
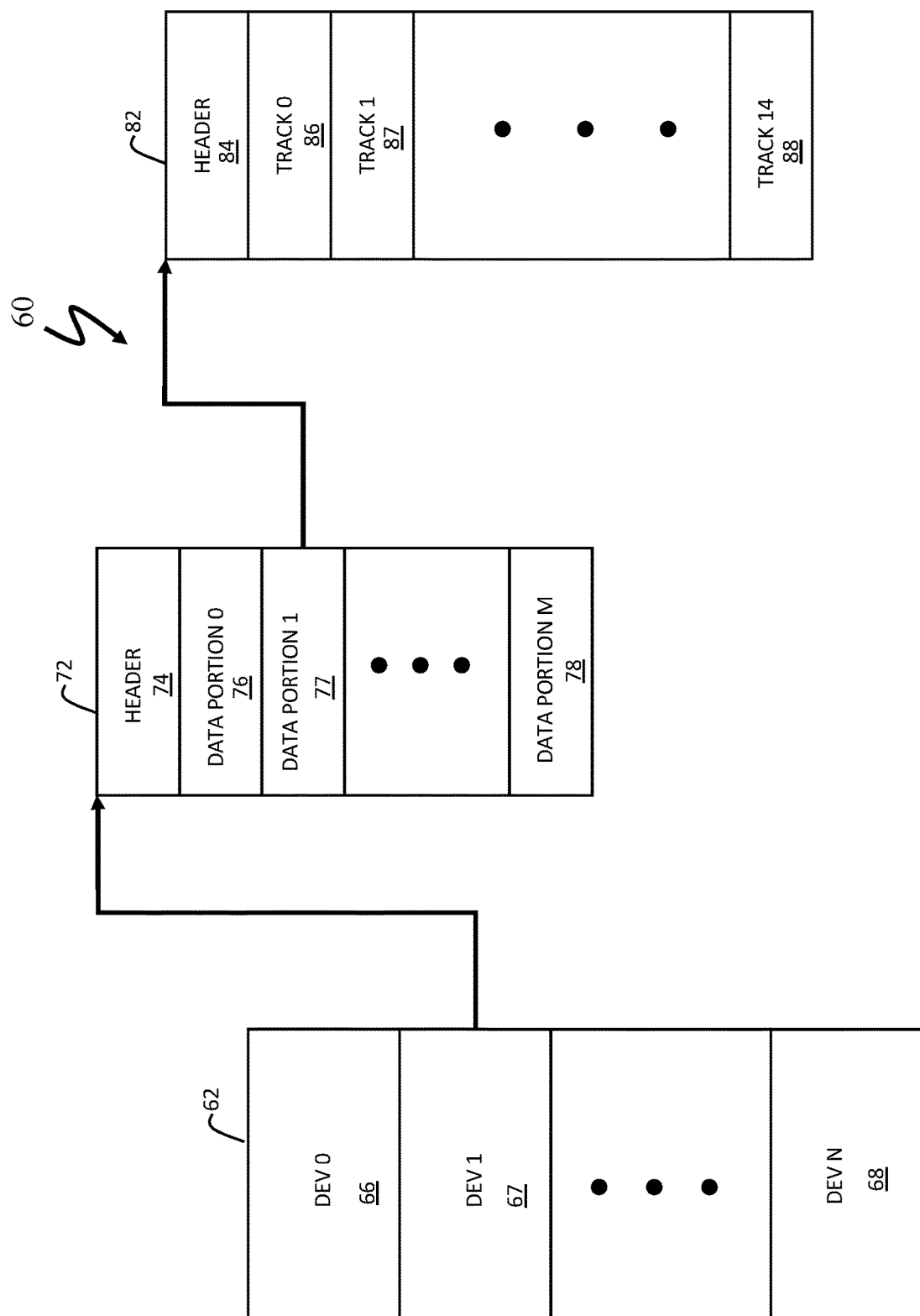
FIG. 3 is a block diagram illustrating an example of tables for keeping track of logical information associated with storage devices, according to embodiments of the invention.

FIG. 3 is a block diagram illustrating an example of tables 60 for keeping track of logical information associated with storage devices, according to embodiments of the invention. A first table 62 corresponds to all of the logical devices used by the storage system 24 or by an element of a storage system, such as an HA and/or a DA. The table 62 may include a plurality of logical device entries 66-68 that correspond to the logical devices used by the data storage system 24. The entries in the table 62 may include descriptions for standard logical devices, virtual devices, log devices, thin devices, and other types of logical devices.

Each of the entries 66-68 of the table 62 may correspond to another table that contains information for each of the logical devices. For example, the entry 67 may correspond to a table 72. The table 72 may include a header that contains overhead information. The table 72 also may include entries 76-78 for separate contiguous data portions of the logical device (e.g., a cylinder and/or a group of tracks). In an embodiment disclosed herein, a logical device may contain any number of data portions depending upon how the logical device is initialized. However, in other embodiments, a logical device may contain a fixed number of data portions.

Each of the data portion entries 76-78 may correspond to a track table. For example, the entry 77 may correspond to a track table 82 that includes a header 84 having overhead information. The track table 82 also includes entries 86-88 for each of the tracks. In an embodiment disclosed herein, there are fifteen tracks for every contiguous data portion. However, for other embodiments, it may be possible to have different numbers of tracks for each of the data portions or even a variable number of tracks for each data portion. For standard logical devices, the information in each of the entries 86-88 may include a pointer (either direct or indirect) to a physical address on one of the PDs 36a-36c of the storage system 24 (or a remote storage system if the system is so configured). Thus, the track table 82 may be used to map logical addresses of the logical device corresponding to the tables 62, 72, 82 to physical addresses on the PDs 36a-36c of the storage system e 24.

The tables 62, 72, 82 of FIG. 3 may be stored in the global memory 26 of the storage system 24 during operation thereof and may otherwise be stored in non-volatile memory (i.e., with the corresponding physical device). In addition, tables corresponding to logical devices accessed by a particular host may be stored in local memory of the corresponding one of the HA's 28a-28c. In addition, the RA's 32a-32c and/or the DA's 38a-38c may also use and locally store portions of the tables 62, 72, 82.

Figure 4:
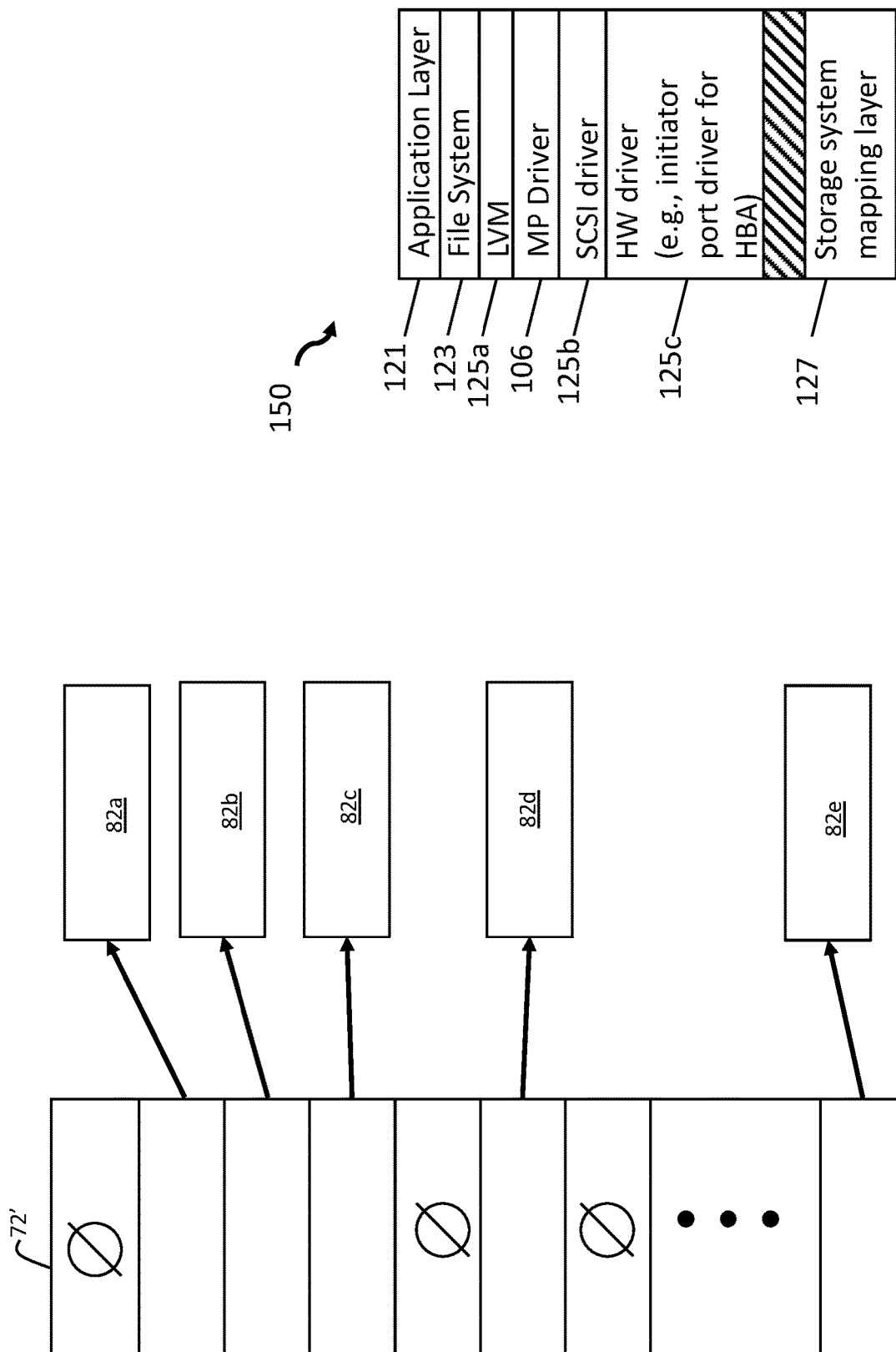
FIG. 4 is a diagram illustrating an example of a table used for a thin logical device, according to embodiments of the invention.

FIG. 4 is a diagram illustrating an example of a table 72' used for a thin logical device, according to embodiments of the invention, which may include null pointers as well as entries similar to entries for the table 72, discussed above, that point to a plurality of track tables 82a-82e. The thin logical device may be allocated by the system to show a particular storage capacity while having a smaller amount of physical storage that is actually allocated. When a thin logical device is initialized, all (or at least most) of the entries in the table 72' may be set to null. Physical data may be allocated for particular sections as data is written to the particular data portion. If no data is written to a data portion, the corresponding entry in the table 72' for the data portion maintains the null pointer that was written at initialization.

Figure 5:
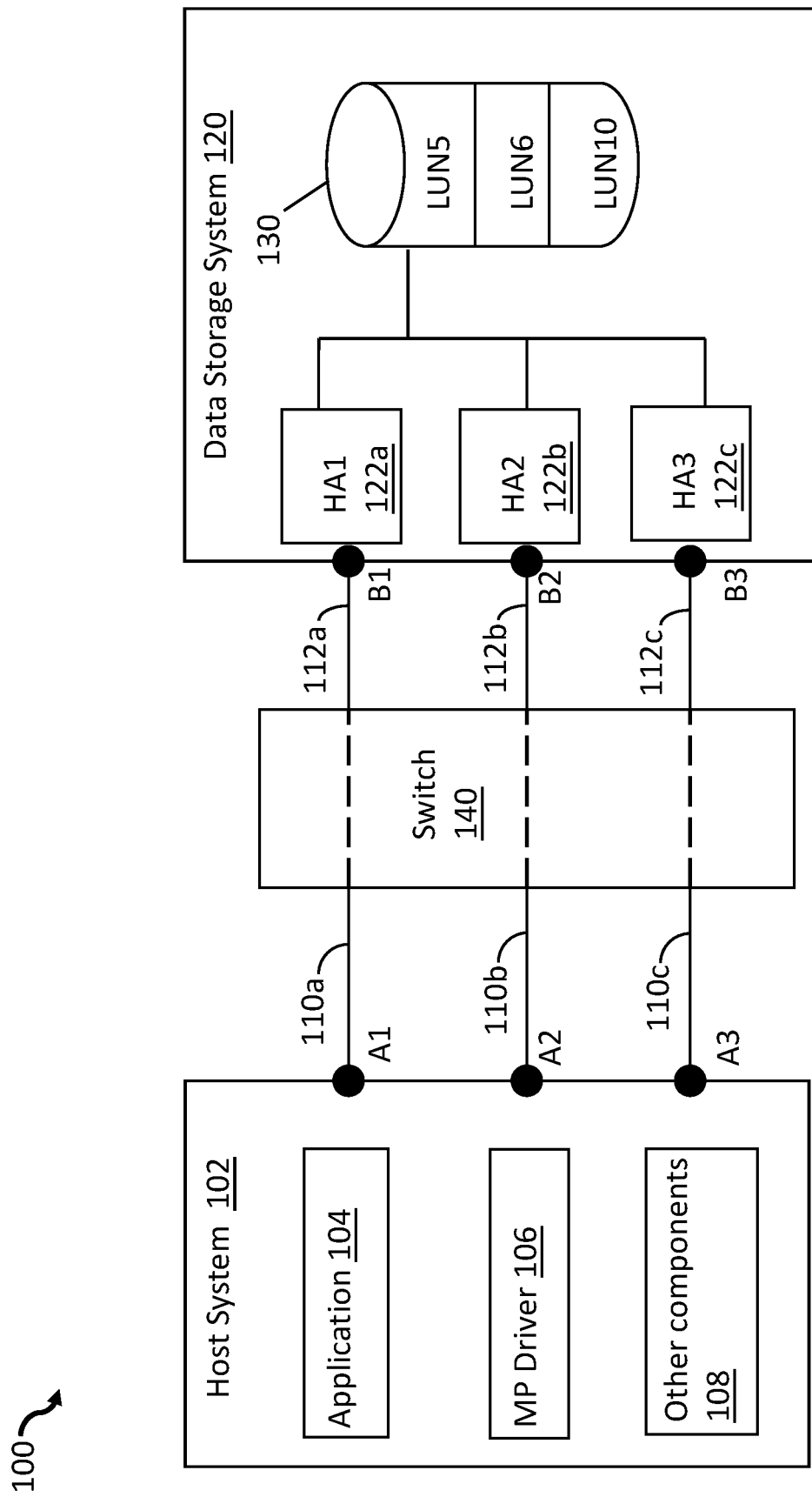
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 12 and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage device 130 may be configured to include three LUNs-LUN5, LUN6 and LUN10. It should be noted that the system 100 includes only a single host system 102, single physical device 130 with 3 LUNs, a single data storage system 120, and a single switch for purposes of simplicity to illustrate the techniques herein. For example, each of the LUNs may be configured to have storage provisioned from multiple different physical devices rather than a single physical device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LUNs of device 130, configured to be accessible to the host system 102 over multiple I/O paths. As such, each of the I/O operations may be forwarded from the application 104 to the data storage system 120 over one of the possible multiple I/O paths. The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical data storage devices, such as device 130, where each such physical device may be configured to store data of one or more LUNs. Each of the LUNs having data stored on the device 130 may be configured to be accessible to the host system 102 through one or more I/O paths. For example, all LUNs of 130 may be accessible using ports of the three front-end directors or interfaces 122a-122c, also denoted respectively HA1, HA2 and HA3. The multiple I/O paths allow the application I/Os to be routed over multiple I/O paths and, more generally, allow the LUNs of device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LUNs of the device 130 in order to determine which of the multiple I/O paths are active or available at a point in time, which of the multiple I/O paths are unavailable for communications, and to use such information to select an I/O path for host system-data storage system communications.

In the example of the system 100, each of the LUNs of the device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LUNs of the device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 5) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host system may perceive as corresponding to a physical device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping a LUN (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LUN known or exposed to the host system may not directly correspond to a physical device such as a disk drive. In such embodiments, the LUN specified by the host system in the I/O operation may be further mapped by the data storage system using its mapping layer 127. For example, a LUN specified by the host system may be mapped by the data storage system to one or more physical drives, and multiple LUNs may be located on a same physical device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LUNs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to I/O operations and other non-I/O commands such as related to host system control operations. I/O operations may include, for example, read and write operations with respect to data stored on a LUN.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such I/O path, one or more LUNs may be visible or exposed to the host system initiator through the target port of the data storage system.

Figure 7A:
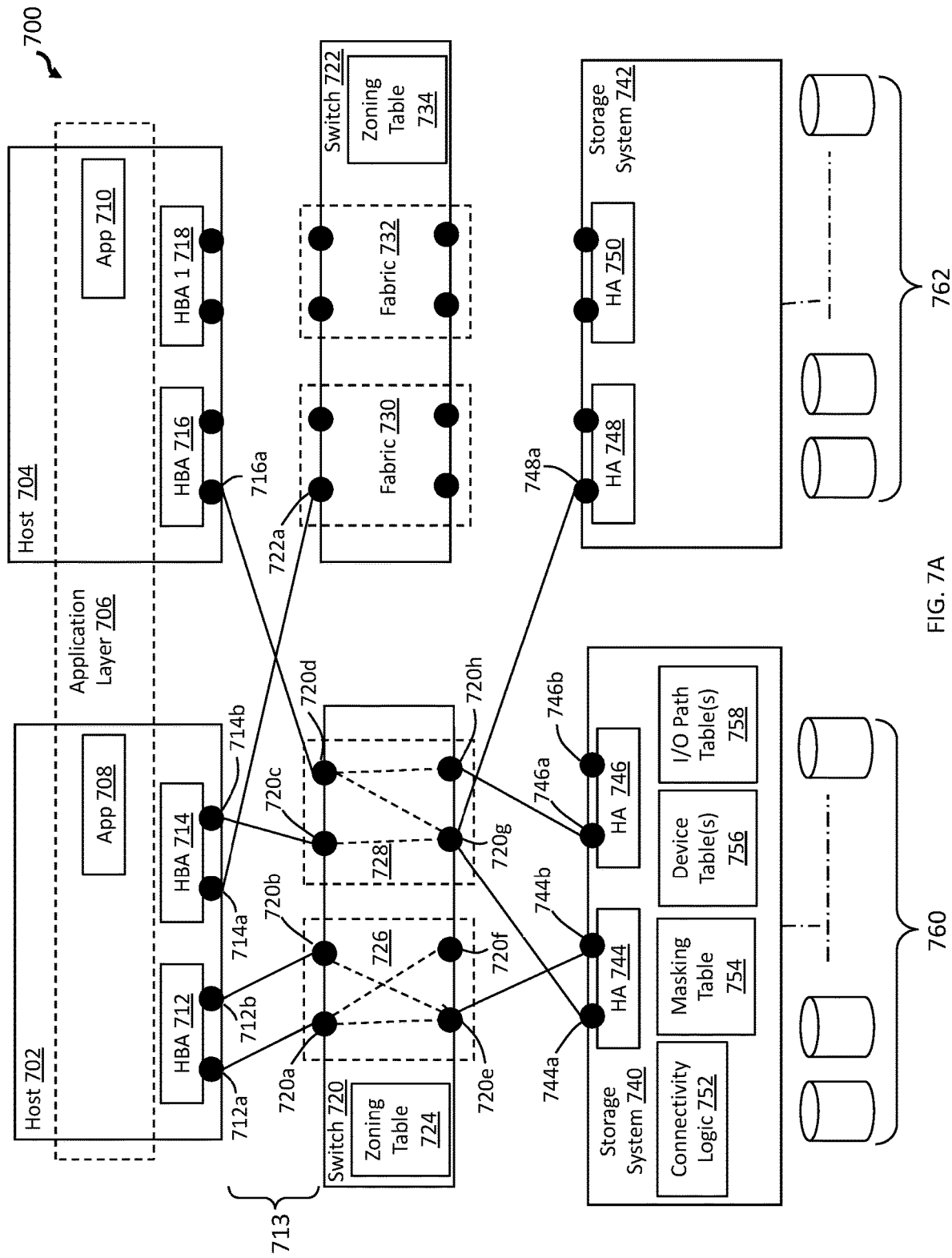
FIG. 7A is a block diagram illustrating an example of a storage network, according to embodiments of the invention.

FIG. 7A is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; physical storage devices 760 and 762; other components; or any suitable combination of the foregoing. It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective applications layers of the software stacks of hosts 702 and 704, each of which may be an application layer 121 as described in relation to FIG. 6.

Host 702 may include any of: a portion of the application layer at 706; application 708; HBAs 712 and 714; and physical host ports 712a, 712b, 714a and 714b. The portion of application layer 706 running on host 702 may include application 708 and one or more other applications. HBA 712 may include physical host ports 712a and 712b, and HBA 714 may include physical host ports 714a and 714b. HBAs 712 and 714 each may be separate discrete logical or physical components of host 702, and host 702 may include more than the two HBAs illustrated. Each of the physical host ports 712a, 712b, 714a and 714b may be connected to an SHP (i.e., fabric port) of switch 720 or 722 by physical connections 713. Each such physical connection may be a cable and, in some embodiments, there is only allowed one physical connection between each physical host port and fabric port (e.g., in accordance with a technology standard (e.g., FC)) as illustrated in FIG. 7A. That is, in some embodiments, each fabric port is dedicated to one physical host port. Host 704 may include any of: a portion of the application layer at 706; application 710; HBAs 716 and 718; and multiple physical host ports including physical host port 716a of HBA 716.

FIG. 7A illustrates physical host ports 712a, 712b, 714a, 714b and 716a connected to fabric ports over physical connections 713 in which there is only one physical connection 713 between each physical host port and each fabric port. However, as noted in more detail elsewhere herein, some technologies permit multiple virtual host ports to be defined, in which two or more virtual ports are given a different unique ID (e.g., a WWN) that actually correspond (i.e., map) to a same physical port. That is, each virtual host port may be a logical or virtual representation of a host port, and may have a unique host port ID, and two or more of the virtual host ports may correspond to a same physical host port. Accordingly, multiple virtual host ports may be defined on either of hosts 702 and 704 for each of its respective physical host ports, including physical host ports 712a, 712b, 714a, 714b and 716a.

Figure 7B:
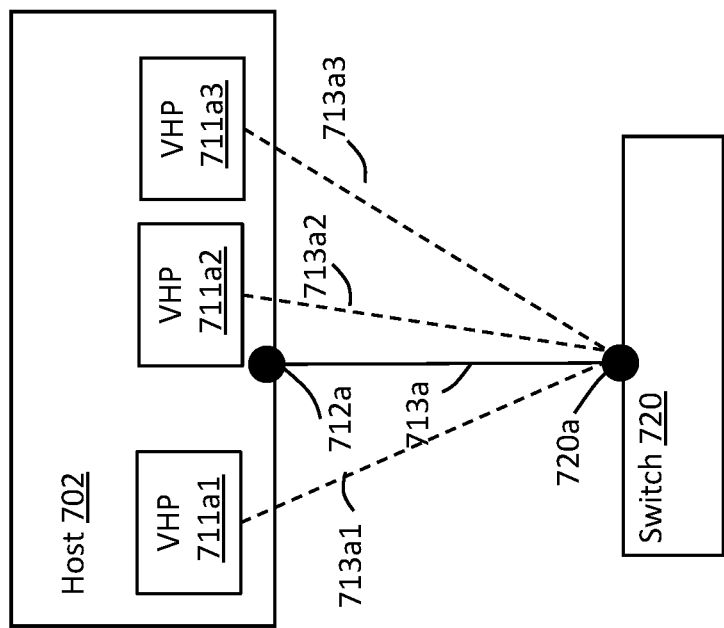
FIG. 7B is a block diagram illustrating an example of connections between a host and a switch, according to embodiments of the invention.

FIG. 7B is a block diagram illustrating an example of multiple logical connections between a host and a switch, according to embodiments of the invention. Other embodiments of a storage network, for example, variations of what is illustrated in FIG. 7B, are possible and are intended to fall within the scope of the invention. As in FIG. 7A, physical host port 712a of host system 702 is connected to fabric port 720a of switch 720. Host system 702 may be configured to implement one or more forms of virtualization technology in which a plurality of virtual host ports (VHPs) 711a1, 711a2 and 711a3 are defined for a single physical host port 712a. That is, host system 702 (e.g., a component thereof such as, for example, a multi-path driver (e.g., MP driver 106)) may have assigned different unique port IDs (e.g., WWNs) to each of VHPs 711a1, 711a2 and 711a3, even though they all map to the same physical host port 712a. Accordingly, one or more logical connections 713a1, 713a2 and 713a3 corresponding to physical connection 713a may be defined for VHPs 711a1, 711a2 and 711a3, respectively, between host 702 and switch 720.

It should be appreciated that switches (e.g., switches 720 and 722) and storage systems (e.g., storage systems 740 and 742) may not be configured to implement virtual host ports, and thus may not have knowledge that multiple port IDs map to the same physical host port. That is, from the perspective of a switch, storage system or other storage network component, the concept of a host port is synonymous with a physical host port, as there is no concept of a virtual host port. For ease of reference, and in some cases taking into consideration a network components view of things, which does not include the concept of a virtual host port, the term "host port" may be used unqualified by the term "virtual" or "physical" and may be used in such cases to cover both virtual host ports and physical host ports.

Returning to FIG. 7A, switch 720 may include any of: zoning table 724, fabrics 726 and 728; ports 720a-h; other components; or any suitable combination of the foregoing. Zoning table 724 may be a data structure that defines which host ports (as defined by a unique identifier such as a WWN), e.g., corresponding to physical host ports 712a, 712b, 714a, 714b and 7116a, are allowed to communicate with which storage system (e.g., HA) ports, for example, 744a, 744b, 746a, 746b and 748a. The switch 720 may use the information in the zoning table 724 to determine the internal switch connections between fabric ports and SSPs to implement the defined zones, as illustrated by the dashed lines within switch 720 in FIG. 7A. Zoning table 724 or another data structure on switch 720 may define one or more fabrics, including fabrics 726 and 728, for example, by specifying the switch ports that are members of the fabrics, as described in more detail elsewhere herein. For example, a data structure on switch 720 or elsewhere may define that fabric 726 includes ports 720a, 720b, 720e and 720f. Switch 722 may include any of: zoning table 734, fabrics 730 and 732; several ports including port 722a; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

Storage system 740 may include any of: connectivity logic 752; masking table 754; device table(s) 756; I/O path table(s) 758; HAs 744 and 746; storage system ports 744a, 744b, 746a and 746b; other components; and any suitable combination of the foregoing. Device table(s) 756 may define properties of storage devices of the storage system 740, including logical devices (which may include thin devices) corresponding to physical storage devices 760, as described in more detail elsewhere herein. Masking table 754 may define which host ports (e.g., 712a, 712b, 714a, 714b, 716a) are permitted to communicate with which storage devices over which storage system ports (e.g., 744a, 744b 746a, 746b). I/O path table(s) 758 may include one or more data structures that define I/O paths between storage devices and an application layer (e.g., 706) as is described in more detail elsewhere herein. Connectivity logic 752 may be configured with logic (software, hardware, firmware or a combination thereof) to perform one or processes in accordance with I/O connectivity on a storage network, for example, one or more of the methods relating to I/O connecting described herein. Storage system 742 may include any of the same or similar components as storage system 740, including HA 748 and storage system port 748a thereof. In some embodiments, storage systems 740 and/or 742 may be a storage system 20a and/or 120 described in relation to FIGS. 2A and 5, respectively, or include one more components and/or functionality thereof.

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table (e.g., masking table 754). Data structure 800 may include a plurality of entries 810, each entry representing a storage device identified in column 802 and specifying a host port (e.g., by WWN) in column 804 with which the identified storage device is allowed to communicate I/O over the storage system port identified in column 806. Other information, for example, the host and/or the HBA associated with the host port and/or the HA associated with the storage system port may be specified in column 808. A data structure other than a table, for example, a linked list and/or object-oriented data structure, may be used to record the same information.

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. Data structure 900 may be a zoning table, and may include a plurality of entries 910, each entry representing an initiator port (e.g., a host port) in column 902 and a target port (e.g., a storage system port) in column 904 with which the initiator port may communicate over a fabric. Other information, for example, host, HBA, HA, fabric name, etc. may be specified in column 906. A data structure other than a table, for example, a linked list and/or object-oriented data structure, may be used to record the same information.

Figure 10:
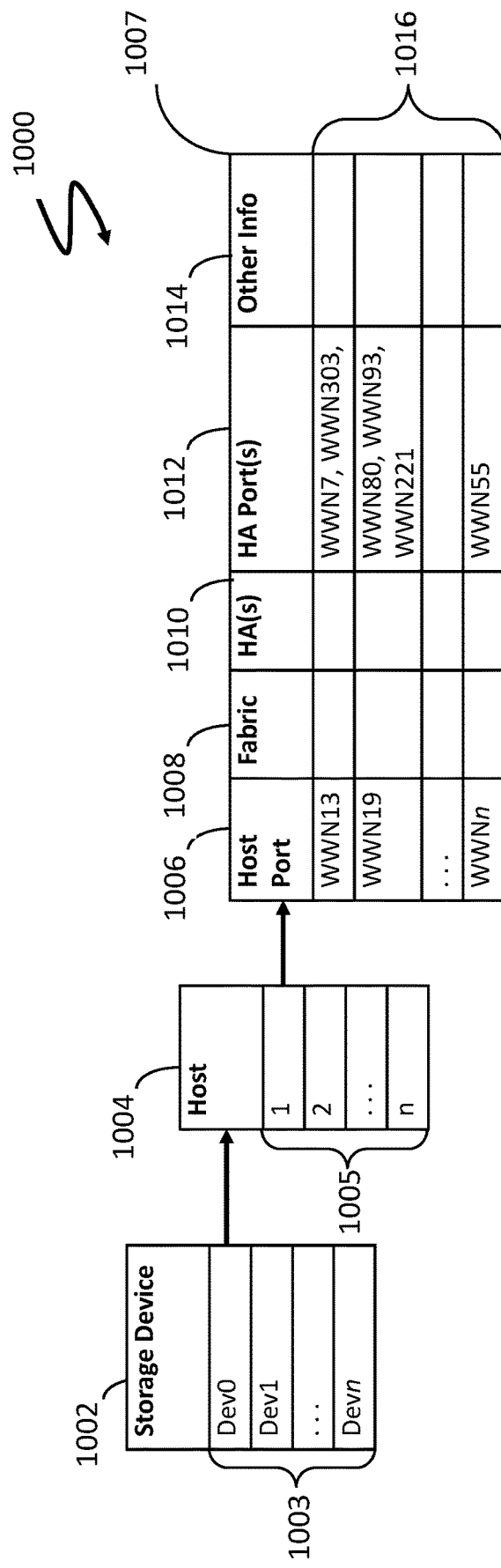
FIG. 10 is a block diagram illustrating an example of data structures defining I/O paths for one or more storage devices, according to embodiments of the invention.

FIG. 10 is a block diagram illustrating an example of data structures 1000 defining I/O paths for one or more storage devices, according to embodiments of the invention. Other embodiments of a data structure defining I/O paths for one or more storage devices, for example, variations of data structure 1000, are possible and are intended to fall within the scope of the invention. Data structures 1000 may be used for I/O path table(s) 758 described in relation to FIG. 7A above. The information in data structures 1000 may be compiled from data found in one or more other data structures, for example, data structures 800 and 900, for example, initially when a host system logs into a storage system and later in response to system updates.

Data structure 1002 may include a plurality of entries 1003, each entry representing a storage device and specifying an identifier of a storage device, for example, an identifier used in device table 62 described above in relation to FIG. 3. Each entry 1003 may have a reference to a host data structure 1004, which includes one or more entries 1005, each entry specifying a host for which connectivity is defined for the storage device referencing it. Each entry in host table 1004 may reference a host port table 1007 having a plurality of entries 1016. Each entry may represent and specify a host port ID in column 1006. Each entry may specify the storage network components (e.g., switch, storage system and/or host components) that in various combinations define I/O paths between the storage device and the host port represented by the entry, including the fabric (column 1008), one or more HAs (column 1010), one or more HA ports (column 1012) (i.e., storage system ports) and other information (column 1014) for which I/O can be communicated between the storage device and the host port. The other information may include an HBA corresponding to the host port and/or additional I/O path components or other information. In some embodiments, for a given host port, rather than listing the one or more HAs, HA ports and other information all in one entry (i.e., row), there may be a separate entry for each combination of HA, HA port or other I/O path component, such that each entry defines a specific I/O path. In such embodiments, there may be multiple entries for each host port as defined by a host port ID. It should be appreciated that various indexes and other data structures for any of the information in data structures 1000 may be created from data structure 1000.

Data structures other than those represented in FIG. 10 may be used to record the same information. Further, two or more of data structures 1002, 1004 and 1007 may be combined. For example, in some embodiments, a single data structure representing the information recorded in data structure 1002, 1004 and 1007 may be used in which each entry specifies a storage device and host as well as the information specified for each entry in host port table 1005.

Figure 11:
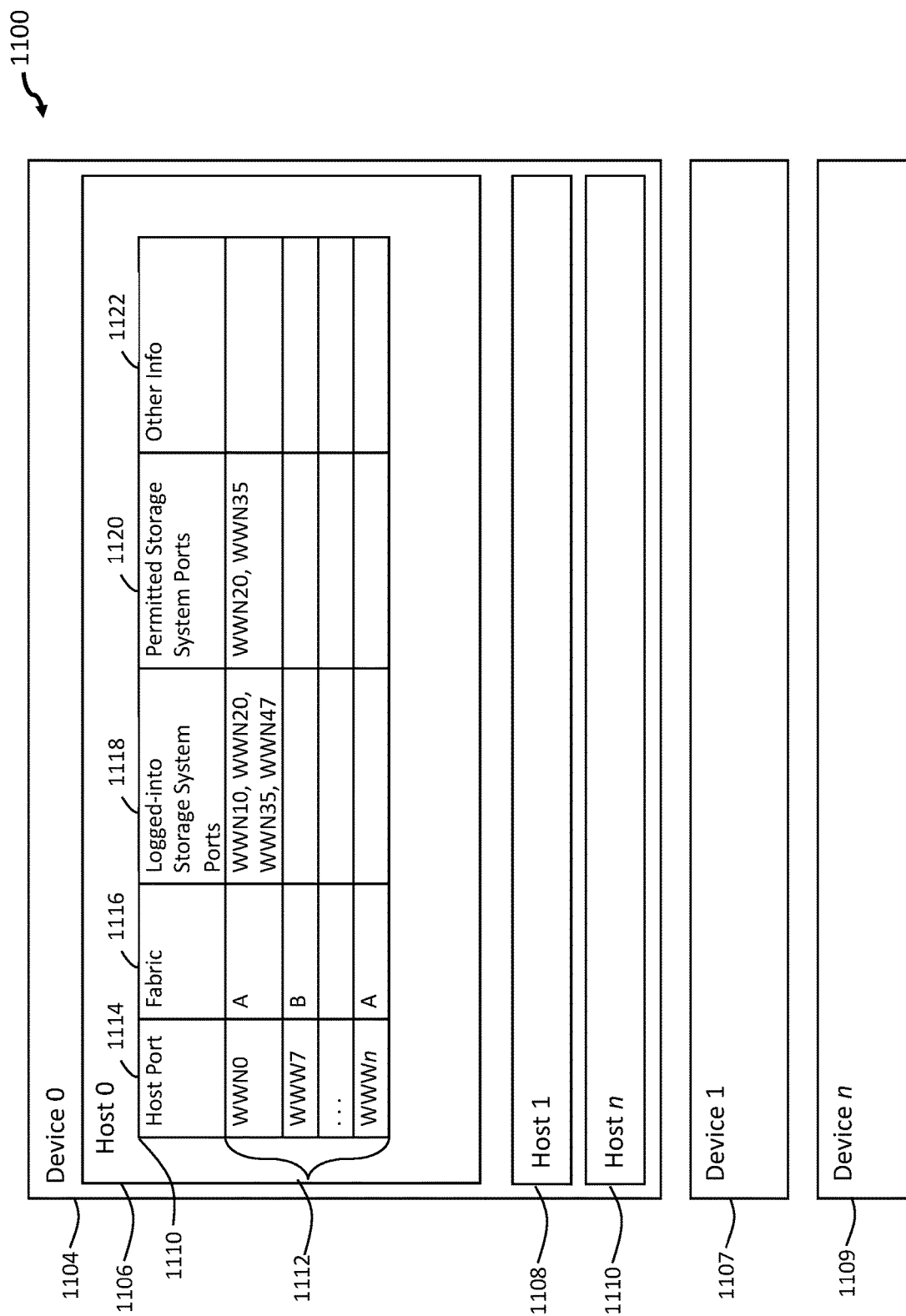
FIG. 11 is a block diagram illustrating an example of a display of I/O path information, according to embodiments of the invention.

FIG. 11 is a block diagram illustrating an example of a display 1100 of I/O path information, according to embodiments of the invention. Other embodiments of a display of I/O path information, for example, variations of display 1100, are possible and are intended to fall within the scope of the invention. Display 100 may display I/O path information in a manner that facilitates a user identifying an SPoF by identifying, from the collective I/O path information displayed for a storage network component, any I/O path component that appears only once. Display 1100 may display information specific to a storage device in each of device areas 1104, 1107 and 1109. Within each device display area, information specific to one or more hosts having at least one I/O connection with the storage device may be displayed in host display areas. For example, device display area 1104 may include host display areas 1106, 1108 and 1110. Within each host display area, information specific to I/O paths between the host and the storage device corresponding to the host area and the device area containing the host area may be displayed. For example, host area 1106 may display information about one or more host ports having at least one I/O connection with the storage device, which may be included in an I/O path permissions table 1110. I/O path permissions table 1110 may include a plurality of entries, each entry specifying a host port (column 1114) having I/O connectivity with the storage device, and specifying the fabric (column 1116) through which the host port is connected to at least one system port, the storage system ports to which the host port is logged in (column 1118), and the storage system ports for which the host port has permission to communicate I/O with the storage device (e.g., per a masking table of the storage system) (column 1120).

A user can review the visually presented data to determine SPoFs. For example: if only one host is listed for a storage device (e.g., there is only one host area 1106), the host may be an SPoF; if there is only one host port listed for a host, the host port may be an SPoF with respect to the host; if only one host port is listed for all of the collective I/O path information listed (e.g., across all hosts), the host port may be an SPoF with respect to a collective application layer of the hosts of the storage network; if only one permitted storage system port is listed for a given host port, the permitted storage system port may be an SPoF for a given host port; if only one permitted storage system port is listed for all of the collective I/O path information listed for a given host (e.g., in a host area 1106), the permitted storage system port may be an SPoF for a given host; if only one permitted storage system port is listed for all of the collective I/O path information listed (e.g., across all hosts), the permitted storage system port may be an SPoF with respect to a collective application layer of the hosts of the storage network; if only one fabric is listed for all of the collective I/O path information listed for a given host (e.g., in a host area 1106), the permitted storage system port may be an SPoF for a given host; and if only one fabric is listed for all of the collective I/O path information listed (e.g., across all hosts), the fabric may be an SPoF with respect to a collective application layer of the hosts of the storage network. Similar visual SPoF analysis could be done for any other I/O path components for which information is displayed (e.g., in a similarly structured manner) such as, for example, HBAs, HAs and other components.

In some embodiments, the determination of an SPoF may go beyond merely identifying whether there is only one I/O path component listed. For example, it may be determined that a storage system port is an SPoF between a host and a storage system because it is the only storage system port listed in both column 1118 and column 1120 for any of the entries 1112 of table 1110. It should be appreciated that rather than listing logged-into storage system ports and permitted storage system ports separately (e.g., in columns 1118 and 1120), analysis could be performed (e.g., by connectivity logic 752) to determine the overlap between the two lists for a given port, and only those that appear on both lists displayed, e.g., in a single column, for an entry. This presentation would make the visual determination of a system port being an SPoF easier, but displaying both pieces of information separately may assist a user in diagnosing the cause of the storage system port being an SPoF. For example, the user may determine the cause of the SPoF is defined permissions (e.g., in a masking table) or that a host port has not logged into a storage system port, perhaps because of the way the fabric is zoned (e.g., in zoning table 724); and the solution may be to update permissions, e.g., in a masking table or zoning table.

It should be appreciated that the information presented in display 1100 also may reflect that there is no I/O connection between certain storage devices and other system components (e.g., hosts or host ports), and the information may reveal why this is the case—e.g., there is no overlap between the storage system ports to which a host port is logged in and the storage system ports through which the host port is permitted to communicate I/O with the storage device.

In some embodiments, the determination of an SPoF or other determination with respect to I/O connectivity described herein may be performed in an automated fashion, e.g., by connectivity logic 752.

Figure 12:
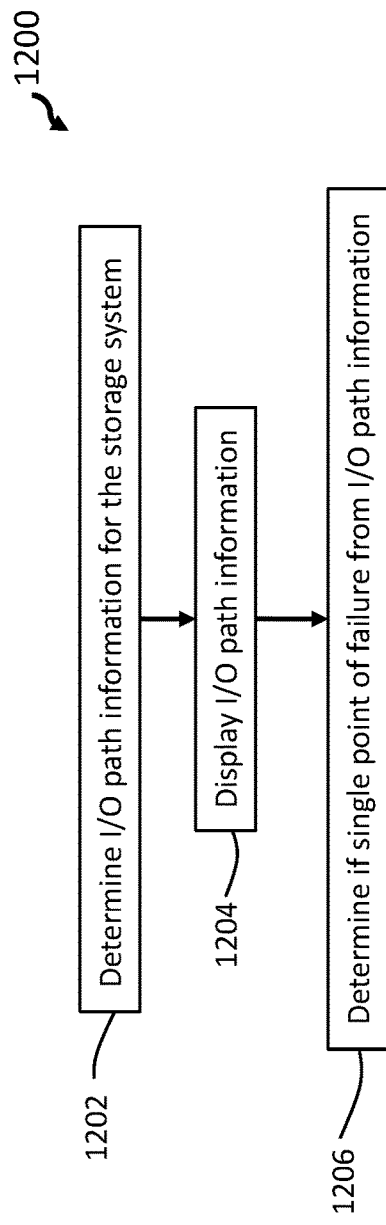
FIG. 12 is a flow chart illustrating an example of a method of determining an SPoF on a storage network, according to embodiments of the invention.

FIG. 12 is a flow chart illustrating an example of a method 1200 of determining an SPoF on a storage network, according to embodiments of the invention. Other embodiments of a method of determining an SPoF on a storage network, for example, variations of method 1200, are possible and are intended to fall within the scope of the invention. In step 1202, I/O path information may be determined for the storage system, for example, as described in more detail elsewhere herein, e.g., in relation to FIG. 13. In step 1204, I/O path information may be displayed, and may be displayed in a manner that facilitates a user identifying SPoFs on a storage network, for example, as described above in relation to FIG. 11. In step 1206, it may be determined from I/O path information whether there is an SPoF. This may be done by visual inspection of displayed I/O path information, or in an automated manner (e.g., by connectivity logic 752), as described in more detail elsewhere herein, or by a combination of visual inspection and automated processing.

Figure 13:
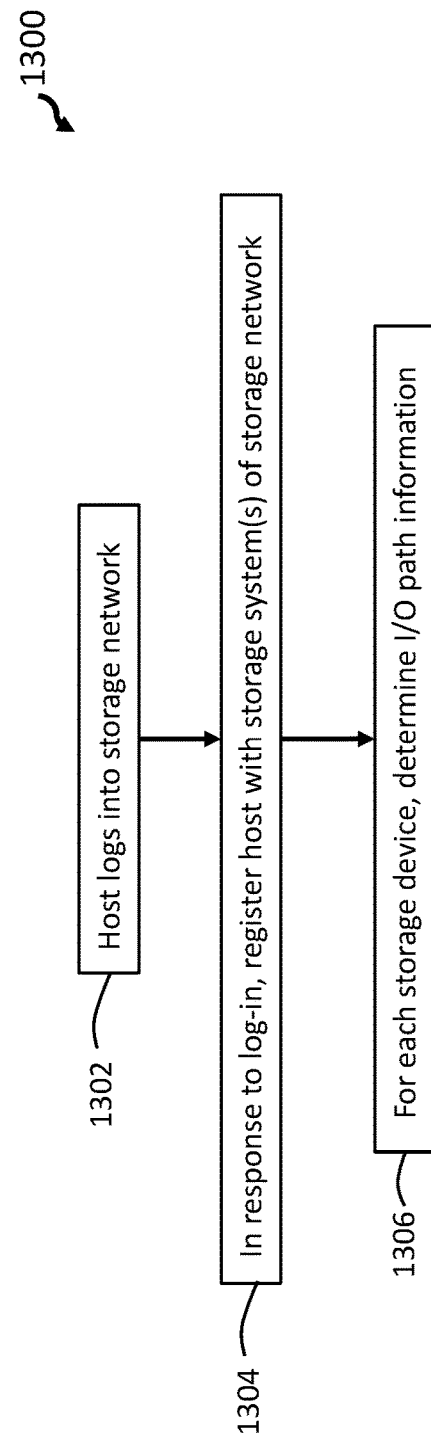
FIG. 13 is a flow chart illustrating an example of a method of determining I/O path information for a storage system, according to embodiments of the invention.

FIG. 13 is a flow chart illustrating an example of a method 1300 of determining I/O path information for a storage system, according to embodiments of the invention. Other embodiments of a method of determining I/O path information for a storage system, for example, variations of method 1300, are possible and are intended to fall within the scope of the invention. In step 1302, a host may log into a storage network (e.g., a SAN) as described in more detail elsewhere herein. For example, a host port of a host may log into a switch. In step 1304, in response to the host logging in to the storage network, the host may register with the storage system. For example, the host port may learn connectivity information from the switch, including the fabric (which may represent a VSAN) to which the host port belongs based on the fabric port to which the host port is connected. This learned connectivity information also may include the storage system ports to which the host port is connected or allowed to communicate with, which may be defined in a zoning table (e.g., zoning table 724 and/or data structure 900). The host system then may log into the one or more storage ports on the storage system to which it learned it was connected from the switch.

In step 1306, I/O path information between one or more storage devices on the storage system and the logged-in host may be determined, for example, in response to each host system logging in. The I/O path information may be determined from a variety of sources, including, but not limited to: information learned by the host, from its own knowledge (e.g., host name), and from logging into the switch (e.g., fabric names, connections between host ports and storage system ports, IDs of the foregoing components); data structures on the storage system (e.g. masking table 754 and/or data structure 800); and other sources. The I/O path information may be stored on the storage system or elsewhere, for example, in I/O path table(s) 758 and/or data structure 1005.

Figure 14:
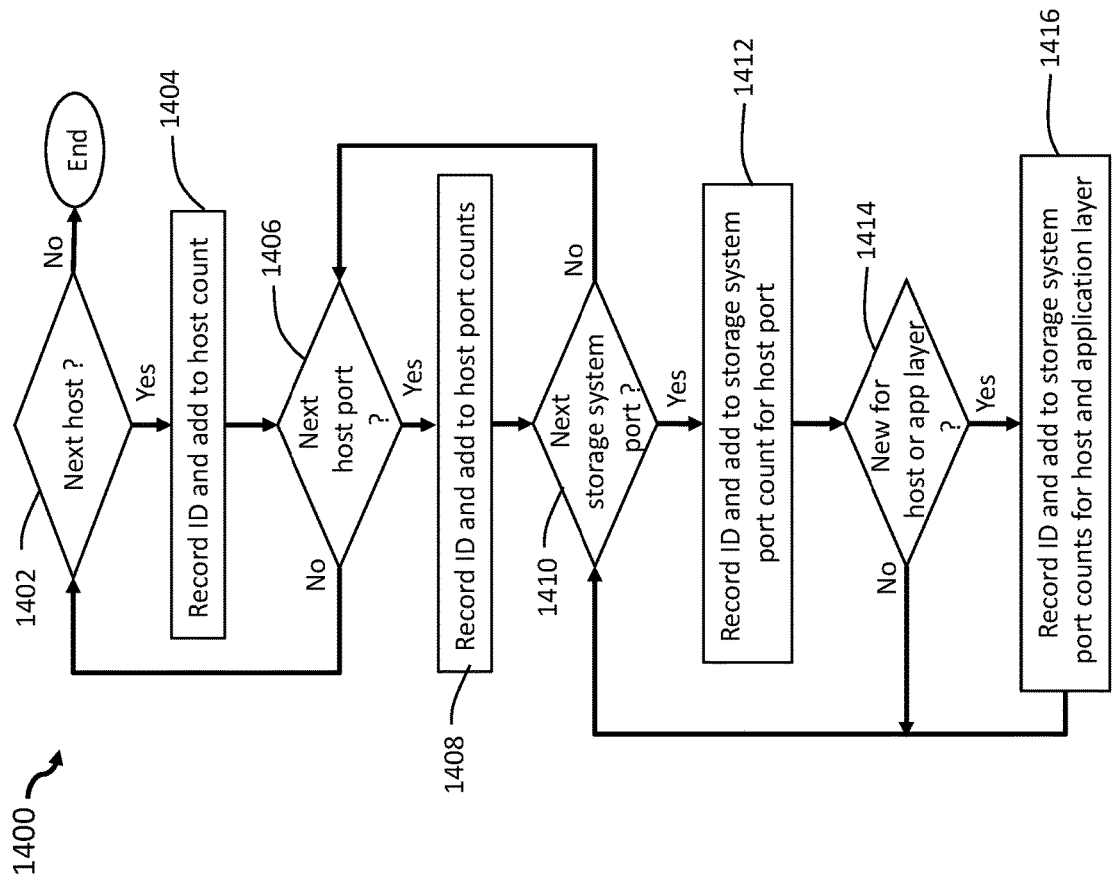
FIG. 14 is a flow chart illustrating an example of a method of determining an SPoF from I/O path information, according to embodiments of the invention.

FIG. 14 is a flow chart illustrating an example of a method 1400 of determining an SPoF from I/O path information, according to embodiments of the invention. Other embodiments of determining an SPoF from I/O path information, for example, variations of method 1400, are possible and are intended to fall within the scope of the invention. Method 1400 may be implemented by connectivity logic 752. In the example of method 1400, an SPoF between a storage device and an application layer may be determined, but it should be appreciated that the invention is not so limited, as a variation of method 1400 may be applied to determine an SPoF between any two components on a storage network. Performance of method 1400 may include accessing data structures 1000 and/or other data structures.

Although not shown in FIG. 14, an initial step may include initializing application-level count variables, i.e., setting application-level count variables to zero. Application-level count variables may include host count, host port count, fabric count, storage system port count, as well as other count variables for whatever I/O path components are being considered in determining an SPoF. In step 1402, it may be determined whether there is a next host for which conductivity to the storage device has been defined, for example, by accessing data structure 1002. If there is a next such host, then in step 1404 an ID of the host may be recorded and the application-level host count may be incremented by 1. Also, although not illustrated in FIG. 14, if it is determined that there is a next host, host-level count variables may be initialized.

In step 1406, it may be determined whether there is a next host port for the current host, for example, by accessing data structure 1004 for the current host. If there is a next host port for the current host, then in step 1408 a host port ID (e.g., WWN) may be recorded, and the application-level host port count and the host-level host port count may be incremented by 1. Also, although not illustrated in FIG. 14, if it is determined that there is a next host port, host port-level count variables may be initialized. Further, the fabric ID (e.g., name) of the fabric to which the host port is connected may be determined (e.g., from data structure 1007) and recorded, and the application-level fabric count and the host-level fabric count may be incremented.

In step 1410, it may be determined whether there is a next storage system port for the current host port, for example, by accessing data structure 1007 for the current host port. If there is a next storage system port for the current host port, then a storage system port ID (e.g., WWN) may be recorded, and the host port-level storage system count may be incremented by 1. In step 1414, it may be determined whether this is the first time that the storage system port has been encountered as an I/O path component for either the application layer or the host. If so, the application-level storage system port count and/or the host-level storage system port count respectively, may be incremented by 1.

After the performance of step 1416, or if the test performed in step 1414 returns negative, method 1400 may return to step 1410. If it is determined in step 1410 that there is not a next storage system port for the current host port, then method 1400 may return to step 1406. If it is determined in step 1406 that there is not a next port for the current host, then method 1400 may return to step 1402. If it is determined in step 1402 that there is not a next host, then method 1400 may end.

As a result of performance of method 1400, for the application layer and each host and host port for which there is at least one I/O path with the storage device, the number of I/O path components of each type (e.g., host, host port, fabric, storage system port) and identities (e.g., names) of the components on the I/O path(s) between the storage device and the application layer, host and host system, respectively, may be determined and recorded. From this information, it can be determined with there is an SPoF between a storage device and any of: the application layer; a host; a host port, or other storage network components for which such counts and IDs were recorded. That is, a count=1 may represent an SPoF between the storage device and the storage network component for which the count was tallied. It should be appreciated that other information may be gleaned from the counts and IDs determined by performance of method 1400 as described in more detail elsewhere herein, including but to limited to determining that there is no connection between a storage device and another storage network component, or there is a number of failure points between the storage system and another network component that is below an acceptable threshold, which may be predefined.

In response to a determination of an SPoF and/or other information learned per the foregoing, an alert may be issued to a system administrator, customer or other persons, for example, as described in more detail elsewhere herein. Further, actions may be taken to change connectivity between components of the storage network (e.g., using a zoning table, masking table, or changing physical connections (cables) between ports) based on one or more of the foregoing combinations, for example, to eliminate an SPoF or otherwise enhance connectivity between network components.

In some cases, there may be multiple host ports that share a same physical host port, which if unknown to a storage system (or other network component determining SPoFs or otherwise assessing I/O connectivity) could result in erroneous conclusions. Accordingly, it may be beneficial for a storage system and/or other storage network components to know when two or more host ports share a same physical port of a host system.

Figure 15:
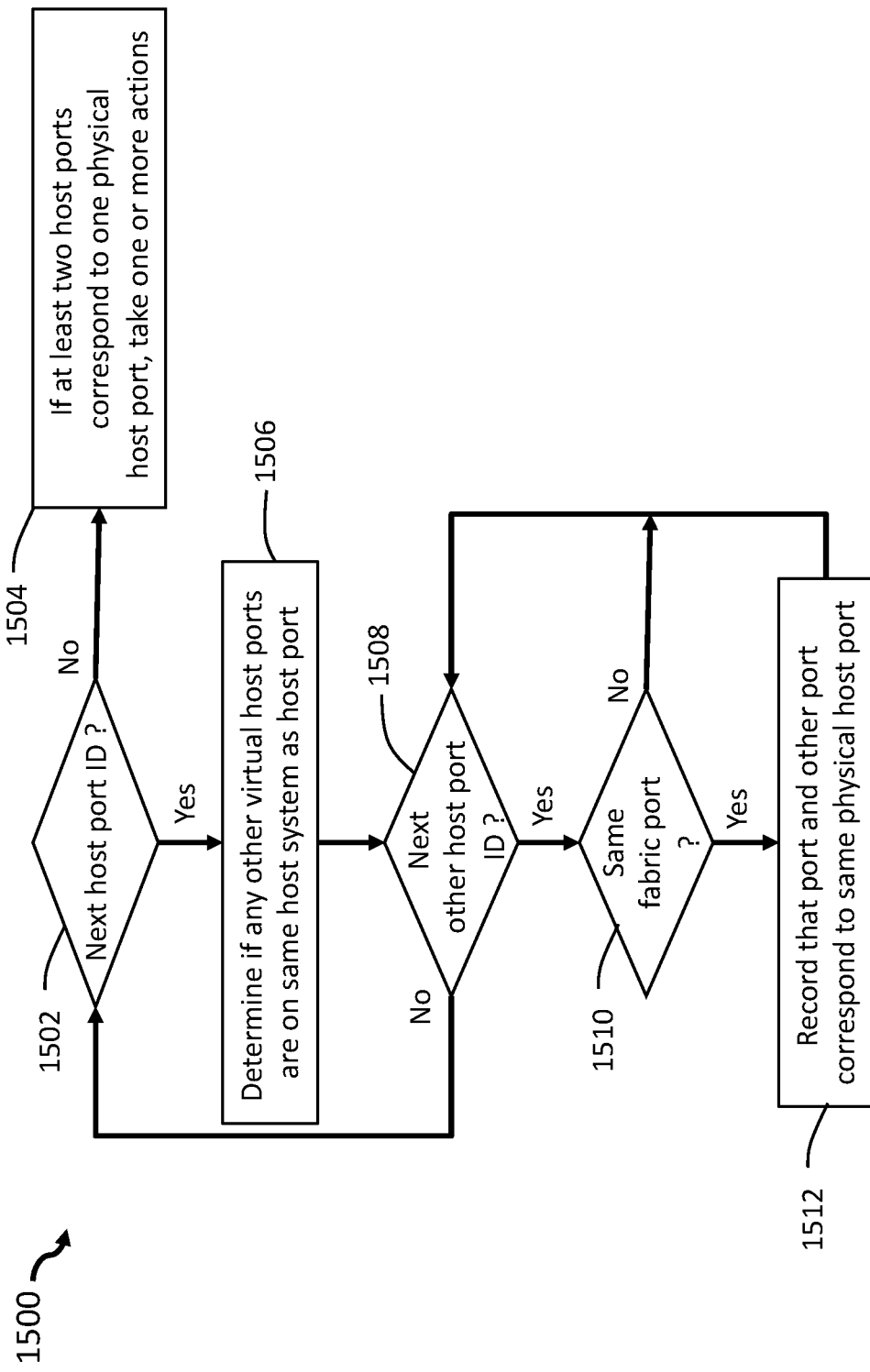
FIG. 15 is a flow chart illustrating an example of a method of determining whether multiple host ports share a same physical host port, according to embodiments of the invention.

FIG. 15 is a flow chart illustrating an example of a method 1500 of determining whether multiple virtual host ports share a same physical host port, according to embodiments of the invention. Other embodiments of a method of determining whether multiple virtual host ports share a same physical host port, for example, variations of method 1500, are possible and are intended to fall within the scope of the invention. Method 1500 may be performed by a component on a storage system, for example, connectivity logic 752 described above in relation to FIG. 7A.

Method 1500 may be performed for each virtual host port on a host system, either at a time when each such virtual host port logs into the system, at a scheduled time (e.g., periodically) or in response to an another event (e.g., a user initiating the method). For example, in some embodiments, method 1500 may be performed sequentially for multiple virtual host ports communicatively coupled to a storage system, such as will now be described in relation to FIG. 15. In step 1502, it may be determined whether there is a next host port ID to be processed, and if so, method 1500 may proceed to step 1506. In step 1506, it may be determined if any other virtual host ports are on the same host system as the virtual host port currently being processed, for example, based on the current host port ID. For example, in some embodiments of the invention, when a host system, or more particularly a virtual host port of a host system, logs onto the storage system, an identifier (e.g., name) of the host system may be recorded on the storage system and associated with the host port ID (e.g., WWN) of each virtual host port of the host system. For example, this information may be recorded in an I/O path table 758 described above in relation to FIG. 7A. This recorded host system name and association with host port IDs may be used in step 1506 to determine if any other virtual host ports are on the same host system as the port currently being processed; e.g., by comparing host system IDs associated with each port ID. By identifying any other virtual host ports that are on the same host system as the current virtual host port, the field of potential virtual host ports that may be on a same physical host port may be reduced, saving time and system resources. That is, only the virtual host ports on the same host system may be sharing a same physical host port, so if this information is known there is no need to check all other host port IDs of which the storage system is aware. It should be appreciated that without knowledge of the host name and its associated host port IDs, the storage system may be unaware of whether or not any of the virtual host ports of which it has knowledge are on a same host system.

In step 1508, it may be determined whether there is a next host port ID to consider, which may be a next of all of the host port IDs of which the storage system has knowledge (e.g., from log-ins or otherwise), or be a next host port ID of the hosts ports on the same host system as the current host port under consideration as determined in step 1506. If there is a next other host port ID, then in step 1510 it may be determined whether next other host port ID is for a virtual host port connected to the same fabric port as the virtual host port currently under consideration, for example, by accessing an I/O path table (e.g., I/O table 758) as described in more detail elsewhere herein. In embodiments in which FC technology is used, step 1510 may include issuing one or more GFPN_ID queries from the storage system to the fabric connecting the current virtual host port (e.g., learned during login) to the storage system under consideration. Prior to sending this communication, it may be determined whether the current virtual host port and the other virtual host port are connected to the storage system using the same fabric, for example, by using their respective port IDs to consult an I/O path table as described in more detail elsewhere herein. That is, if the two virtual ports are not on the same fabric, then it is not possible that they use the same fabric port. If it determined that the two virtual host ports are connected to the same fabric (or if such a determination was not even considered), a single GFPN_ID query may include port IDs (e.g., WWNs) of both the current virtual host port and the other virtual host port, or a separate GFPN_ID query may be sent for each host port, each query including the port ID of each host port, respectively. For example, an initial query may be sent for the current virtual host port and then additional queries may be sent for each other host port determined in step 1508. It should be appreciated that in embodiments in which FC technology is not used, a communication may be sent from the storage system port to a switch port using a different technology to determine fabric ports corresponding to host ports.

In step 1510, in response to the query sent from the storage system port to the switch (e.g. including one or more WWNs), the switch may return a communication indicating the one or more fabric ports corresponding to the one or more host port IDs (e.g., WWNs), respectively, included in the query. The fabric port values returned by the switch in response to the one or more queries then may be compared to determine whether they specify the same fabric port. If it is determined in step 1510 that the current virtual host port (e.g., having a host port ID "WWNx") and the other host port (e.g., having a host port ID "WWNy") are connected to the same fabric port (e.g., having a switch port ID "WWNz"), then it may be concluded that the current virtual host port and the other virtual host port correspond to a same physical host port of a host system; i.e., share a same physical host port, and this information may be recorded. This conclusion may be based in part on a requirement imposed by technology (e.g., FC) employed on the storage network that, at any given time, each fabric port can be physically connected to only one physical host port (e.g., by a cable).

After the performance of step 1512 or if step 1510 returns negative, method 1500 may return to step 1508. If it is determined in step 1508 that there is no next other host port ID, then method 1500 may return to step 1502. If it is determined in step 1502 that there is no next host port ID to process, then method 1500 may proceeded to step 1504. That is, upon advancing to step 1504, the analysis has been completed of determining whether there are multiple virtual host ports communicatively coupled to the storage system that share a same physical host port (e.g., in accordance with NPIV technology).

In step 1504, one or more actions may be taken on a storage network based at least in part on a determination that at least two host virtual ports correspond to (e.g., are sharing) a same physical host port. For example, it may be determined whether there is an SPoF between a storage device of the storage system and an application layer of a host system based at least in part on the at least two virtual host ports corresponding to a same physical host port. That is, without knowledge that two or more virtual host ports share a same physical host port, it may have been erroneously concluded that there was not an SPoF on an I/O path at the virtual host port. However, with knowledge that the two or more virtual host ports share a same physical host port, port connectivity permissions may be adjusted (e.g., on a storage system or switch) to alleviate the SPoF.

In some embodiments, it may be determined that a workload corresponds to a first virtual host port based at least in part on a determination that the first virtual host port shares a physical host port with a second virtual host port to which the workload is attributed, and this determination may be used to assess and potentially adjust workload on the physical host port.

In some embodiments, it may be determined that a port on the storage system is not at fault for one or more communication failures between the storage system port and the at least two virtual host ports based at least in part on at least two ports corresponding to a same physical host port. That is, a storage network component (e.g., a host system or storage system) may be configured to determine that a storage port is "flaky" if multiple different host ports report connectivity issues with the storage port. However, if it determined that the two virtual host ports are in fact sharing a same physical host port, then the conclusion that the storage port is causing the problem (e.g., is flaky) may be erroneous, as the issue may lay with the physical host port, which may need to be further investigated.

It should be appreciated that any of a variety of other action may be taken on a storage system based at least in part on the knowledge that two host ports share a same physical host port.

While determining and eliminating (or reducing) SPoFs should reduce the likelihood of connectivity failure between components of a storage network, it may not eliminate them altogether. However, in some cases, information gleaned from network activity may appear to be indicative of a connection failure, when in fact that is not the case. Raising false alarms in these scenarios can waste time and resources. Thus, it would be beneficial to be able to more accurately recognize when a connection failure actually occurs, as opposed to intentional changes to I/O connectivity causing the appearance of a connectivity failure.

Figure 16:
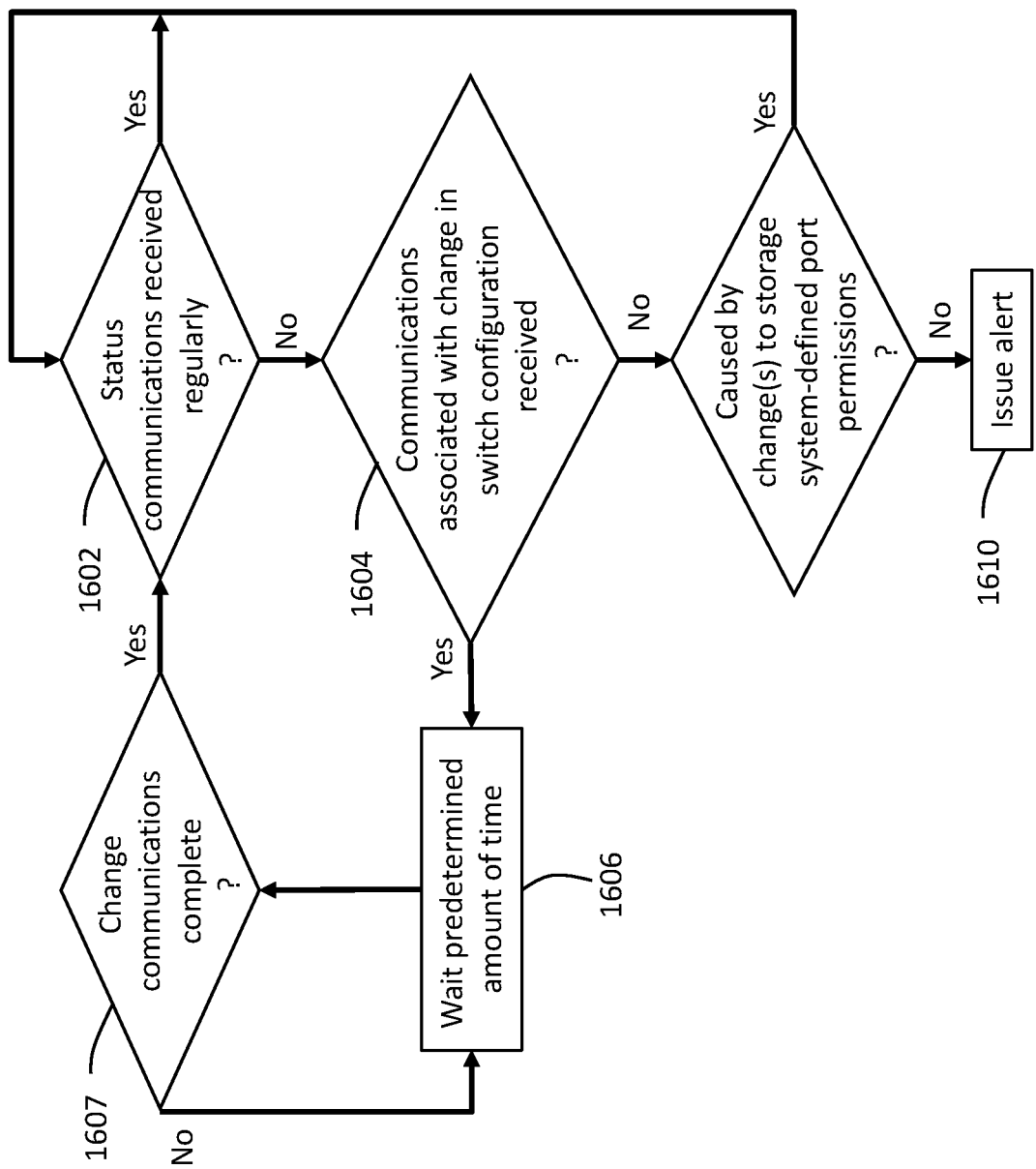
FIG. 16 is a flow chart illustrating an example of a method of assessing causes of I/O connectivity loss on a storage network, according to embodiments of the invention.

FIG. 16 is a flow chart illustrating an example of a method 1600 of assessing causes of I/O connectivity loss on a storage network, according to embodiments of the invention. Other embodiments of a method of assessing causes of I/O connectivity loss on a storage network, for example, variations of method 1600, are possible and are intended to fall within the scope of the invention. Method 1600 may be performed by a component on a storage system, for example, connectivity logic 752 described above in relation to FIG. 7A. Method 1600 may be performed for each host port on a host system, and will now be described in relation to performing the method a single host port on a ho system.

In step 1602, it may be determined whether status communications have been received regularly from a host port. In embodiments in which FC technology is employed, the status communications may be Test Unit Ready (TUR) commands of an SCSI protocol. Determining whether communications have been received regularly may include determining whether a predetermined number of status communications has been received within a predetermined amount of time. For example, a frequency with which status communications are received from the host port may be determined (e.g., one per second, one per minute, etc.). The predetermined number and the predetermined amount of time may be based at least in part on this frequency and an understanding of what number of missed status communications warrants consideration of whether there is a connection loss. This understanding may be based on historical information and experience.

If it is determined in step 1602 that status communications have been received regularly, then method 1600 may return to step 1602. The loop resulting from returning to step 1602 may be considered as monitoring the status communications received by the host port.

If in step 1602 it is determined that status communications have not been received regularly, then, in step 1604, it may be determined whether one or more communications associated with a change in a configuration of a switch have been received. For example, it may be determined whether communications associated with a change in switch-defined port permissions have been received. Such change may have resulted from a change in the zoning of a switch, as may be reflected in a zoning table of the switch, for example, zoning table 734 described above in relation to FIG. 7A. In some embodiments of the invention, step 1604 includes determining whether a predetermined number of communications have been received within a predetermined amount of time, the predetermined number and the predetermined amount of time indicative of a change in configuration of a switch. These predetermined parameters may be based on previous observations and historical data. In embodiments of the invention in which FC technology is employed, the communications associated with a change in a configuration may be Registered State Change Notification (RSCN) communications. In such embodiments, the predetermined number of RSCN communications within a predetermined amount of time may be indicative of an RSCN storm resulting from a zoning change on a switch.

If it is determined in step 1604 that one or more communications associated with a change in configuration of a switch have been received (e.g., that the communications constitute an RSCN storm), then, in act 1606, a predetermined amount of time may be allowed to pass (e.g., the system may wait) before it may be checked in step 1607 whether the change communications are complete (e.g., whether RSCN storm has passed). If so, then method 1600 returns to step 1602. That is, if the communications have completed, then information updates on the storage system (e.g., the host systems, switches and storage systems) should be complete, so the status communications can again be monitored. If the missing status communications originally determined in step 1602 were caused by a change in switch configurations (e.g., a zoning change), then status communications should now be regularly received, unless the configuration change resulted in the host port no longer being connected to the storage system. In this latter case, the storage system itself should be aware of the removed connection with the host port, and may no longer monitor status communications from the host port.

The predetermined amount of time may be allowed to pass in step 1606 to allow the communications associated with a change in configuration of a switch to complete, e.g., to allow the RSCN storm to pass. This predetermined amount of time may be based on previous observations and historical data. However, the change communication still may not have completed during the predetermined amount of time, which is why step 1607 may be desirable. If it is determined in step 1607 that the change communications have not completed, then method 1600 may return to step 1606 to wait a predetermined amount of time. It should be appreciated that the predetermined amount of time may be different when returning from step 1607 then when arriving at step 1606 from step 1604. For example, the predetermined time in step 1606 when arriving from step 1607 may be less.

If it is determined in at 1604 that communications associated with a change in configuration of a switch (e.g., switch-defined port connectivity permission) were not received, then, in step 1608, it may be determined whether the missing status communications were caused by changes to storage system-defined port permissions. For example, a masking table may have been updated so that the host port is no longer permitted to communicate with one or more ports of the storage system. Thus, step 1604 may include accessing a masking table such as, for example, masking table 754 described above in relation to FIG. 7A.

If it is determined in step 1608 that the missing status communications were not caused by any changes to storage system-defined port permissions, then method 1600 may proceed to step 1610 in which alerts may be issued to system administrators, customers of other persons, as described in more detail elsewhere herein. Thus, in some embodiments of the invention, if it is determined that missing status communications were not caused by a switch configuration change (e.g., changes in switch-defined port connectivity permissions) or changes to storage system defined port permissions, then a conclusion may be reached that there may indeed be an unintentional and/or unauthorized loss of connectivity that warrants the issuing of an alert.

By employing method 1600 on a storage network including, for example, on a storage system, false positives with respect port connectivity failure may be reduced.

It should be appreciated that the order of performance of the steps of method 1600 are not limited to the order illustrated in FIG. 16, and that some steps or portions thereof may be performed in parallel with other steps or portions thereof. For example, step 1608 or portions thereof may be performed before and/or in parallel to steps 1604 and 1606 or portions thereof.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1200, 1300, 1400, 1500 and/or 1600, or parts thereof, may be implemented using one or more of the systems, data structures and/or displays described in relation to FIGS. 1-11 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of determining that at least two virtual host ports correspond to a same physical host port of a host system, comprising:
   determining a plurality of virtual host ports connected to a storage system by a switch;
   determining that the at least two of the plurality of virtual host ports are connected to a same fabric port of the switch, including:
      the storage system issuing one or more queries to the switch, wherein the one or more queries include a first host port ID of a first of the at least two virtual host ports and a second host port ID of a second of the at least two virtual host ports,
      receiving one or more responses to the one or more queries from the switch, the one or more responses including a first fabric port ID of a first fabric port corresponding to the first virtual host port and a second fabric port ID of a second fabric port corresponding to the second virtual host port, and
      comparing the first fabric port ID to the second fabric port ID to determine that the first fabric port ID is the same as the second fabric port ID, which indicates that the first fabric port and the second fabric port are the same fabric port; and
   determining that the at least two virtual host ports correspond to the same physical host port based at least in part on the at least two virtual host ports being connected to the same fabric port of the switch.

2. The method of claim 1, further comprising:
   determining whether there is a single point of failure between a storage device of the storage system and an application layer of a host system based at least in part on the at least two virtual host ports corresponding to a same physical host port.

3. The method of claim 1, further comprising:
   determining that a workload corresponds to a first of the at least two ports based at least in part on the at least two virtual host ports corresponding to a same physical host port.

4. The method of claim 1, further comprising;
   determining that a port on the storage system is not at fault for one or more communication failures between the storage system port and the at least two virtual host ports based at least in part on the at least two ports corresponding to a same physical host port.

5. The method of claim 1, further comprising:
   prior to determining that at least two of the plurality of virtual host ports are connected to a same fabric port of a switch, determining that the at least two ports are of a same host system.

6. The method of claim 1, wherein each of the one or more queries is a GFPN_ID query in accordance with a Fibre Channel protocol.

7. A storage system comprising:
   one or more processors; and
   a memory comprising code stored thereon that, when executed, performs a method of determining that at least two virtual host ports correspond to a same physical host port of a host system, the method comprising:
      determining a plurality of virtual host ports connected to a storage system by a switch;
      determining that the at least two of the plurality of virtual host ports are connected to a same fabric port of the switch, including:
         the storage system issuing one or more queries to the switch, wherein the one or more queries include a first host port ID of a first of the at least two virtual host ports and a second host port ID of a second of the at least two virtual host ports,
         receiving one or more responses to the one or more queries from the switch, the one or more responses including a first fabric port ID of a first fabric port corresponding to the first virtual host port and a second fabric port ID of a second fabric port corresponding to the second virtual host port, and
         comparing the first fabric port ID to the second fabric port ID to determine that the first fabric port ID is the same as the second fabric port ID, which indicates that the first fabric port and the second fabric port are the same fabric port; and
      determining that the at least two virtual host ports correspond to the same physical host port based at least in part on the at least two virtual host ports being connected to the same fabric port of the switch.

8. The storage system of claim 7, wherein the method further comprises:

determining whether there is a single point of failure between a storage device of the storage system and an application layer of a host system based at least in part on the at least two virtual host ports corresponding to a same physical host port.

9. The storage system of claim 7, wherein the method further comprises:
determining that a workload corresponds to a first of the at least two ports based at least in part on the at least two virtual host ports corresponding to a same physical host port.

10. The storage system of claim 7, wherein the method further comprises;
determining that a port on the storage system is not at fault for one or more communication failures between the storage system port and the at least two virtual host ports based at least in part on the at least two ports corresponding to a same physical host port.

11. The storage system of claim 7, wherein the method further comprises:
prior to determining that at least two of the plurality of virtual host ports are connected to a same fabric port of a switch, determining that the at least two ports are of a same host system.

12. The storage system of claim 7, wherein each of the one or more queries is a GFPN_ID query in accordance with a Fibre Channel protocol.

13. One or more non-transitory computer-readable media for a storage system, the computer-readable media having software stored thereon defining a method of determining that at least two virtual host ports correspond to a same physical host port of a host system, the software comprising:
executable code that determines a plurality of virtual host ports connected to a storage system by a switch;
executable code that determines that at least two of the plurality of virtual host ports are connected to a same fabric port of the switch, including:
the storage system issuing one or more queries to the switch, wherein the one or more queries include a first host port ID of a first of the at least two virtual host ports and a second host port ID of a second of the at least two virtual host ports,
receiving one or more responses to the one or more queries from the switch, the one or more responses including a first fabric port ID of a first fabric port corresponding to the first virtual host port and a second fabric port ID of a second fabric port corresponding to the second virtual host port, and
comparing the first fabric port ID to the second fabric port ID to determine that the first fabric port ID is the same as the second fabric port ID, which indicates that the first fabric port and the second fabric port are the same fabric port; and
executable code that determines that the at least two virtual host ports correspond to the same physical host port based at least in part on the at least two virtual host ports being connected to the same fabric port of the switch.

14. The one or more non-transitory computer-readable media of claim 13, wherein the software further comprises:
executable code that determines whether there is a single point of failure between a storage device of the storage system and an application layer of a host system based at least in part on the at least two virtual host ports corresponding to a same physical host port.

15. The one or more non-transitory computer-readable media of claim 13, wherein the software further comprises:
executable code that determines that a workload corresponds to a first of the at least two ports based at least in part on the at least two virtual host ports corresponding to a same physical host port.

16. The one or more non-transitory computer-readable media of claim 13, wherein the software further comprises;
executable code that determines that a port on the storage system is not at fault for one or more communication failures between the storage system port and the at least two virtual host ports based at least in part on the at least two ports corresponding to a same physical host port.

17. The one or more non-transitory computer-readable media of claim 13, wherein the software further comprises:
executable code that, prior to determining that at least two of the plurality of virtual host ports are connected to a same fabric port of a switch, determines that the at least two ports are of a same host system.

* * * * *